(12) United States Patent
Hicks

(10) Patent No.: US 6,810,519 B1
(45) Date of Patent: Oct. 26, 2004

(54) ACHIEVING TIGHT BINDING FOR DYNAMICALLY LOADED SOFTWARE MODULES VIA INTERMODULE COPYING

(75) Inventor: Daniel Rodman Hicks, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 09/675,620

(22) Filed: Sep. 29, 2000

(51) Int. Cl.[7] .............................................. G06F 9/44
(52) U.S. Cl. ...................................................... 717/166
(58) Field of Search ................................. 717/120, 121, 717/140, 162, 163, 164, 165, 166

(56) References Cited

U.S. PATENT DOCUMENTS 5,805,899 A * 9/1998 Evans et al. ................ 717/170
5,966,702 A * 10/1999 Fresko et al. ................. 707/1
6,298,478 B1 * 10/2001 Nally et al. .................. 717/170

OTHER PUBLICATIONS

James Noble, et al., "Object Ownership for Dynamic Alias Protection," 1999, IEEE Computer Society Press, Proceedings of Technology of Object–Oriented Languages and Systems (TOOLS 32) Melbourne, pp 176–187.*

* cited by examiner

Primary Examiner—Todd Ingberg
Assistant Examiner—Eric B. Kiss
(74) Attorney, Agent, or Firm—Moser, Patterson & Sheridan, LLP

(57) ABSTRACT

A computer system, a computer product and a method in which static storage within an environment comprising a plurality of compilation modules is managed such that compiled cloned copies of called externally resolved (with respect to a compilation unit) items are preferentially executed in favor of the corresponding externally resolved item based on a favorable comparison of version information of version information prior to execution. In one embodiment, JAVA® programming language methods are processed within the context a modified framework.

7 Claims, 15 Drawing Sheets

Inlining

•
•
•

Load R1,X
Load R2, Y
BranchAndLink @ 100 ⟶ @100   Add R3,R1,R2

•                                         Return
•
•

•
•
•

Load R1,X
Load R2, Y
Add R3,R1,R2
•
•
•

Inlining (Continued)

•
•
•

LoadImmediate R1,5
LoadImmediate R2,6
BranchAndLink @ 100 ⟶ @100   Add R3,R1,R2

•                                         Return
•
•

•
•
•

LoadImmediate R3,11
•
•
•

MULTIPLE COPIES OF STATIC

*Fig. 6A*

```
Class A {
    static lint X= 5;
    static synchronized int getNext() {      600A
        X++;
        return X;
    }
}
```

*Fig. 6B*

```
class Aprime {
    static lint X= 5;
    static synchronized int getNext() {      600B
        X++;
        return X;
    }
}
```

Virtual Call
•
•
•

Load RA, offset of MethodRef in constant pool(RS)
Load RB, offset of VMT offset in MethodRef(RA)

Load RG, Ø (RO)
Add RD, RB, RC                              *1310*
Load RE, Ø (RD)

Load RF, offset to entry point ptr in MethodRef(RE)
Move RP0, RE
Move RT,RF
BranchIndirect

*Fig. 13*

SEPARATELY COMPILED COPIES OF THE SAME CLASS

```
class A {
        static int doSomthing() {
                        int Y = B.someMethod() - C.anotherMethod();
                        •
                        •
                        •
        }
}
```

Static as compiled for first copy:

- •
- •
- •

@ 11   ptr to B.someMethod
@ 12   ptr to C.anotherMethod

- •
- •     *700*
- •

Static as compiled for fsecond copy:

- •
- •
- •

@ 11   ptr to C.anotherMethod
@ 12   ptr to B.someMethod

TRADITIONAL COMMON ADDRESS SPACE SCHEME

```
class A {
    static int X;
    static int doSomething() {
        X = B.someMethod() - C.anotherMethod();
        •
        •
        •
    }
}
```
810 code

@ 123  Call @ 11
       Call @ 12
       Add
       Store @ 10

820

Static

@ 10   X
@ 11   ptr to B.someMethod
@ 12   ptr to C.anotherMethod

TRADITIONAL COMMON REENTRANT IMAGE SCHEME (Same source)

Code

Call @ 11 (RS)
Call @ 12 (RS)
Add
Store 10(RS)

840

Static

| RS → | |
|---|---|
| • | |
| • | |
| • | |
| 10 | X |
| 11 | ptr to B.someMethod |
| 12 | ptr to C.anotherMethod |
| | |

Indirect Call

•
•
•

Load RA, offset of MethodRef in constant pool(RS)

Load RB, offset of MethodInfo ptr in MethodRef(RA)

Load RC, offset to entry point ptr in MethodInfo(RB)

Move RP0 RB

Move RT, RC

BranchAndLink Indirect                ◄— 1210

•
•
•

Direct Call

•
•
•

Load RA, offset of MethodRef in constant pool(RS)

Load rb, offset of MethodInfo ptr in MethodRef(RA)

Move RP0, RB

BranchAndLink Direct @ of entry

◄— 1220

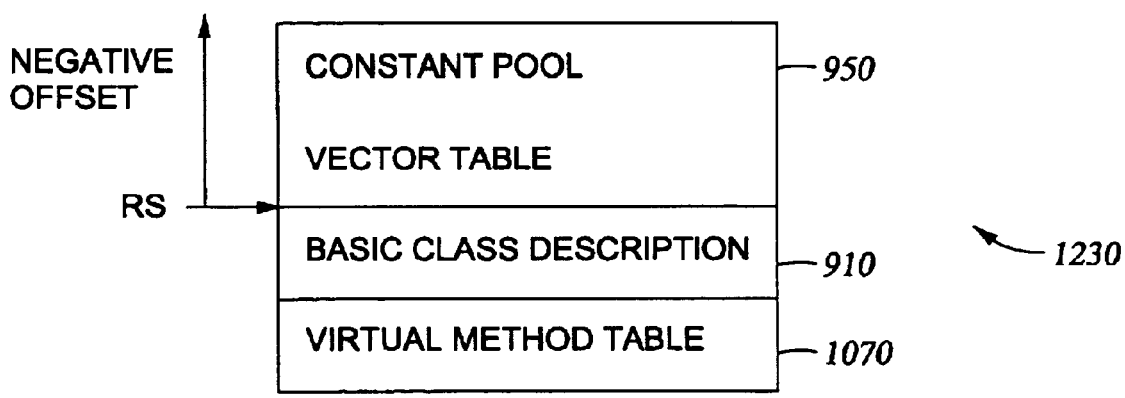

*Fig. 12*

ACHIEVING TIGHT BINDING FOR DYNAMICALLY LOADED SOFTWARE MODULES VIA INTERMODULE COPYING

BACKGROUND OF THE INVENTION

1. Field of the Invention

The invention is generally related to computers and computer software. More specifically, the invention is generally related to improving the execution of software compiled as a plurality of software modules.

2. Background of the Related Art

The most efficient code for a computer program can be generated when all components, including referenced subroutines, are known and are included in the software compilation process. This allows the compiler for the computer program to perform several optimizations that are well-known to the compiler arts, including but not limited to: (a) using the tightest possible call protocol between "caller" and "callee" software modules; (b) inlining of the callee software module into the caller software module; and (c) global analysis. The caller software module is a module or procedure that calls or invokes another software module, subroutine or object. The callee software module is the software module, subroutine or object called or invoked.

Using the tightest possible call protocol between "caller" and "callee" software modules comprises using a direct vs indirect call if the relative address of the callee software module is known (since it is a part of the same compilation unit). Other optimizations such as coordinated register assignment are also possible.

Inlining of the callee software module into the caller software module comprises a step beyond tight binding, where the code of the callee software module is actually copied into the instruction stream of the caller software module. This allows the code of the callee to be customized for the particular case at hand, by, for example, propagating literal parameter values into the body of the callee.

Global analysis comprises the analysis of the data flow beyond the boundaries of a single subroutine, thereby enabling such things as eliminating stores to unreferenced data fields, optimizing into registers data that is only referenced in a localized fashion, and the like.

Even when all the referenced subroutines and other such components of a software program to be compiled are not known at compile time, most of the optimizations that are possible with "complete knowledge" are still possible to a lesser extent with "incomplete knowledge." Thus, there is still an advantage to including in the compilation process those subroutines and other components that can be identified and included.

Unfortunately, in the "incomplete knowledge" case, there are several additional problems that can arise. For example, when the runtime environment of the program to be compiled will consist of several separately compiled pieces or modules, it may be discovered that the same subroutine (or other software component) was included in more than one separately compiled piece or module. This would not be a problem for purely procedural subroutines, but when the subroutines have static storage of one form or another (including the static data structures associated with C++ or JAVA® programming language classes) then errors will result unless a single static storage image is somehow shared between all copies.

When referenced subroutines or other components are included in a compilation unit, it may be discovered at execution time that different versions of those subroutines or components were in different compilation units that comprise the runtime environment of the program. If this is the case, even if a single static storage image is shared between copies errors may result since the expected static storage layout may not be identical between all copies.

Even when separately compiled copies of the same subroutine or other component are compatible and when the problem of addressing a common static storage view is addressed, there may be other static data associated with a subroutine or component that is compiler-generated and hence which cannot be validly shared between copies. Separate copies of such data must be maintained.

It also should be noted that even when all referenced subroutines and other components are known and accessible at compile time, there may be practical reasons why they cannot all be processed within a single compilation operation. For instance, there may be limits to the size of a compiled object that can be created, requiring that the complete computer program be broken into several separate compiled objects.

Binding by copying to avoid references between separate compilation or load units has been done in several contexts, such as in "overlayed" applications to avoid overlay "thrashing." Binding is also performed done to some degree in current dynamic link library (DLL) based implementations as well, in order to permit the advantages of tight binding. However, these designs either require that the copied subroutines be purely functional or require that static storage be manually controlled so that it will be accessible and equivalently viewed from all versions of a given subroutine.

SUMMARY OF THE INVENTION

This invention addresses these and other problems associated with the prior art by providing a computer system, a computer product, a method and a framework in which static storage within an environment comprising a plurality of compilation modules is managed such that compiled cloned copies of called externally resolved (with respect to a compilation unit) items are preferentially executed in favor of the corresponding externally resolved item based on a favorable comparison of version information prior to execution. The cloned copies are compiled in a manner providing internal resolution (with respect to the compilation unit) by, for example, in-line coding. In one embodiment, JAVA® programming language methods are processed within the context of a modified framework.

Specifically, according to an embodiment of the invention, a method for compiling, in one of a plurality of compilation units, a subroutine having associated with it calls to items having addresses resolved external to the one compilation unit, the method comprising the steps of: copying each of the external resolution items into the one compilation unit to form respective internal resolution items, and compiling the subroutine using the external resolution items and the respective internal resolution items, each of the items having associated with it a respective version indicium for identifying inter-compilation unit version conflicts during execution of the compiled subroutine, wherein corresponding compiled external resolution items are executed in the case of inter-compilation version conflicts.

BRIEF DESCRIPTION OF THE DRAWINGS

The teachings of the present invention can b readily understood by considering the following detailed description in conjunction with the accompanying drawing in which:

FIG. 6 depicts a code segment illustrating the use of multiple copies of statically stored objects;

FIG. 7 depicts a code segment useful in understanding the present invention, and more particularly illustrates a problem that can occur with static storage it multiple copies of a class attempt to share the same static;

FIG. 8A depicts a code segment and address space utilization useful in understanding the present invention;

FIG. 8B depicts a reentrant static addressing scheme utilizing the code segment of FIG. 8A:

FIGS. 12 and 13 depict code segments useful in understanding the invention;

To facilitate understanding, identical reference numerals have been used, where possible, to designate identical elements that are common to the figures.

Figure 1:
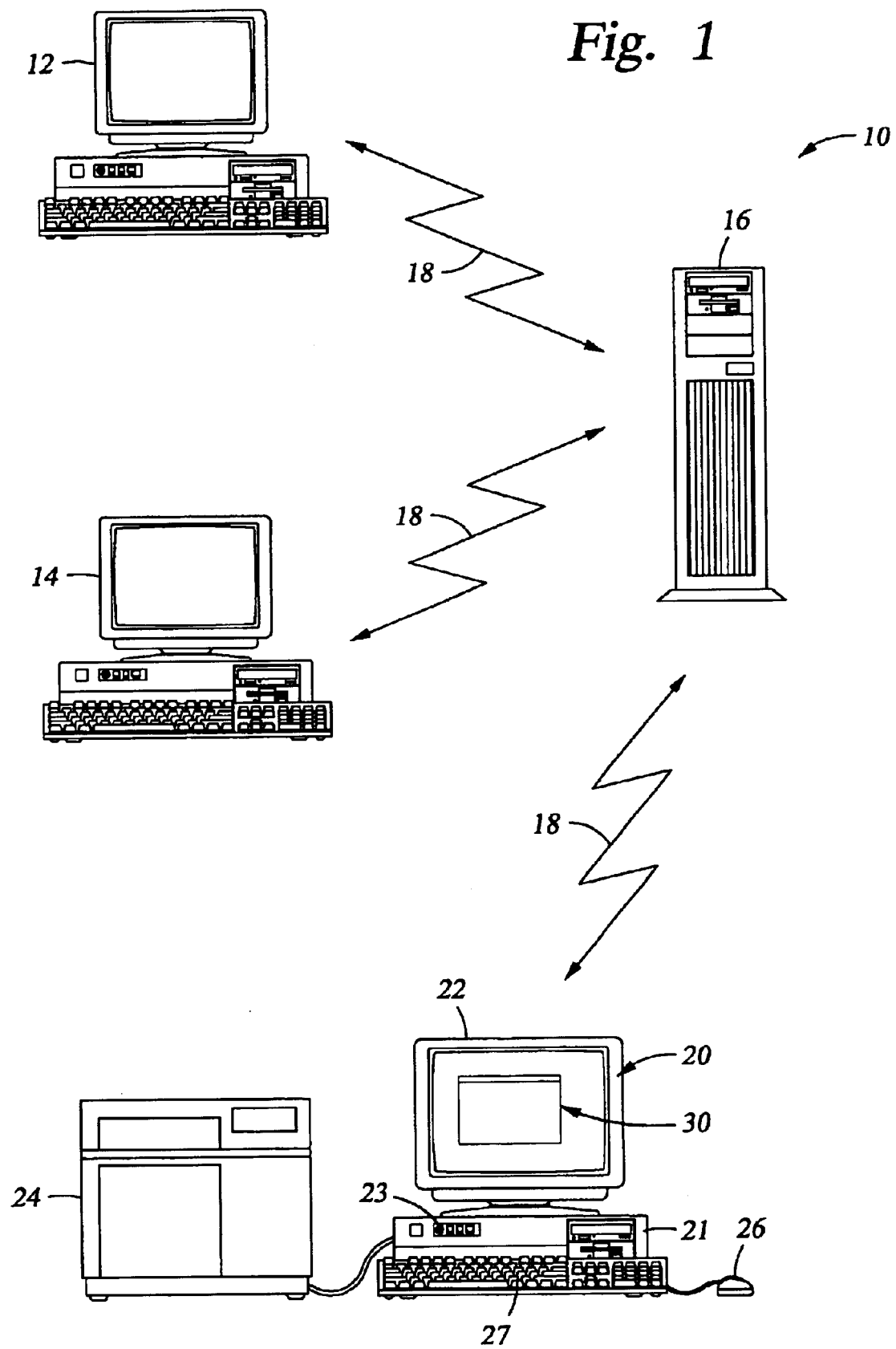
FIG. 1 is a block diagram of a computer system consistent with the invention.

It is to be noted, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

Hardware Environment

Turning to the Drawing, wherein like numbers denote like parts throughout the several views, a computer system 10 consistent with the invention is illustrated in FIG. 1. Computer system, 10 is illustrated as a networked computer system including one or more client computer systems 12, 14 and 20 (e.g. desktop or personal computers, workstations, etc.) coupled to server system 16 through a network 18. Network 18 may represent practically any type of networked interconnection, including but not limited to local-area, wide-area, wireless, and public networks (e.g. the Internet). Moreover, any number of computers and other devices may be networked through network 18, e.g. multiple servers. Furthermore, it should be appreciated that the principles of the invention may be utilized as well by stand-alone computers and associated devices consistent with the invention.

Computer system 20, which may be similar to computer systems 12, 14 may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operative system, and executes various computer software applications, programs, objects, modules, etc. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer program typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
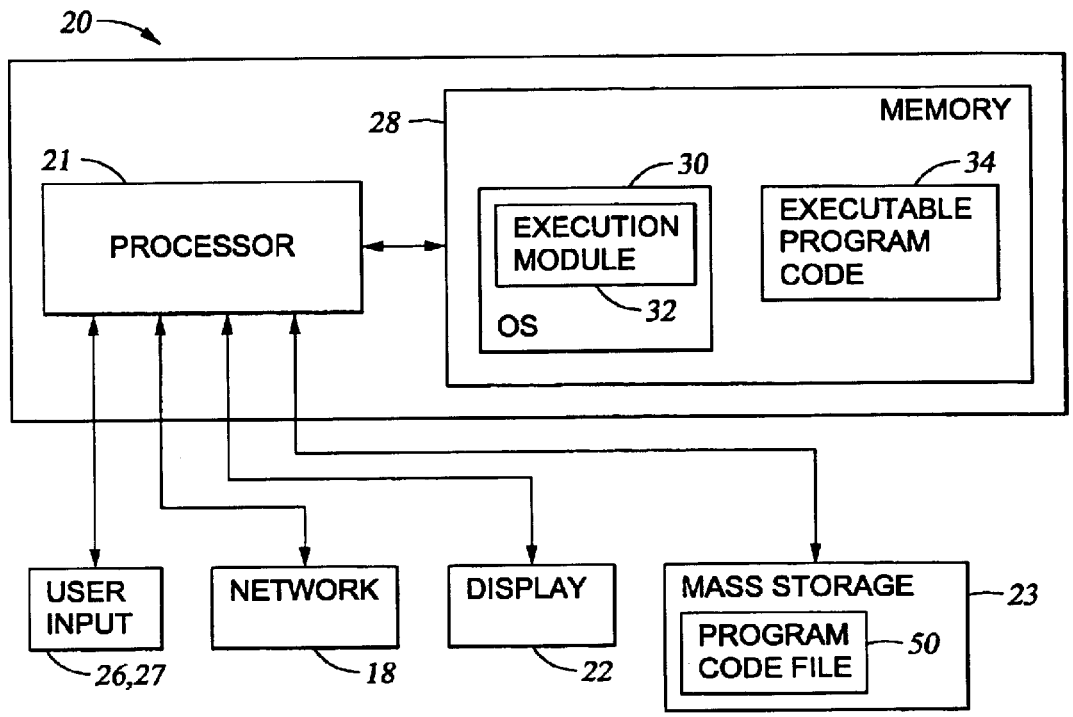
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An operating system 30 is illustrated as resident in memory 28, and executing within this operating system is illustrated an execution module 32 that is configured to execute program code on processor 21, e.g., executable program code 34, as well as to retrieve program code such as program code file 50 from mass storage 23 and/or network 18, among other operations. Execution module 32 may also, in the alternative, be implemented as a separate application that executes on top of an operating system. Furthermore, it should be appreciated that any of the execution module 32, executable program code 34, and program code file 50 may, at different times, be resident in whole or in part in any of memory 28, mass storage 32, network 18, or within registers and/or caches in processor 21.

It will be appreciated by those skilled in the art that other software environments may be utilized in the alternative. In fact, the invention is applicable to any programming language where explicit or implicit static storage is permitted or required, such that executing subroutines that may need to reference static storage are provided with a facility to obtain the address of static storage.

Figure 3A:
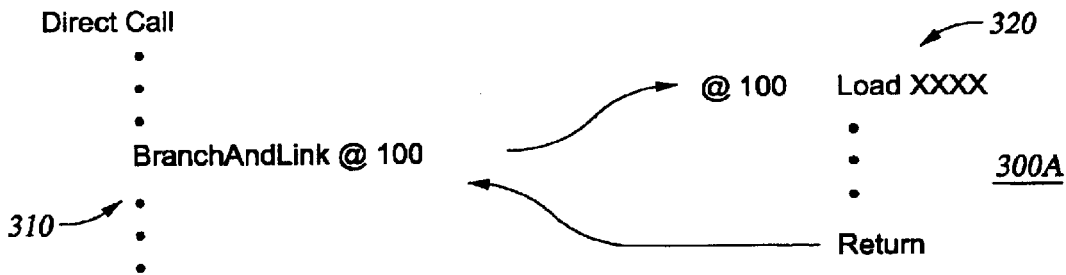
FIG. 3A depicts a code segment illustrating a direct call of a subroutine.
Figure 3B:
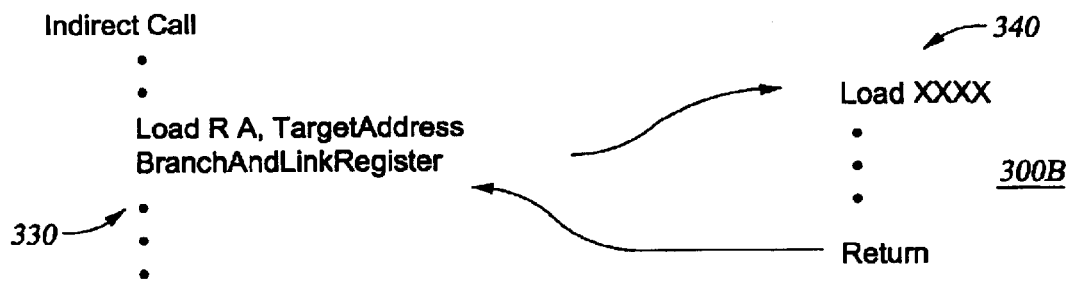
FIG. 3B depicts a code segment illustrating an indirect call of a subroutine.

Compilation of Program Code Providing Tight Binding of Inter-Module Static Storage FIG. 3A depicts a code segment illustrating a direct call of a subroutine. FIG. 3B depicts a code segment illustrating an indirect call of a subroutine. In the direct case of FIG. 3A, a call operation 310 (BranchAndLink) directly contains the address in memory 320 of the entry point of the call target. In the indirect case of FIG. 3B the call target address is loaded from some storage location and then the branch is made to the loaded address.

The direct call may use an offset and a base register rather than encoding the entire target address in the machine instruction. This is still considered a direct call since the base register does not need to be (re)loaded for each call but instead can be loaded once and used to address a large group of subroutines. The indirect call instruction may also vary. In some cases the target address can be loaded into any general purpose register and the call instruction can then address that register. In other cases the target address must be loaded into a special-purpose register, with the register's identity being implicit in the instruction.

Figure 4:
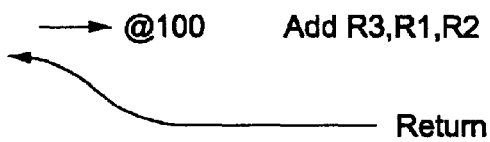
FIG. 4 depicts a code segment 400 illustrating an Inlined access of a subroutine.

FIG. 4 depicts a code segment 400 illustrating an inlined access of a subroutine. In the non-inlined case, two parameters (x, y) are loaded into, respectively, registers R1 and R2, and a branch to the entry point of the target routine is performed. The two parameters are added and the result placed in R3, which is then returned to the caller. In the inlined case, an add operation is copied directly into the instruction sequence of the calling routine, thereby eliminating the call/return overhead.

Figure 5:
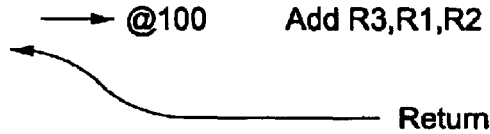
FIG. 5 depicts a code segment illustrating an optimization enabled by the Inlining technique of FIG. 4.

FIG. 5 depicts a code segment illustrating an optimization enabled by the inlining technique of FIG. 4. The code segment 500 of FIG. 5 is similar to the code segment 400 of FIG. 4, except that the two parameters of FIG. 5 are literals and, hence, their values are known to the compiler. The compiler can determine that the result of the add will be 11 and directly load that value, instead of actually loading the parameter values and performing the add. Note that much more sophisticated optimizations, such as elimination of conditional branches, loop unrolling, etc, are possible in slightly more complex cases, once the inlining has made it possible to propagate known parameter values forward.

FIG. 6 depicts a code segment 600 illustrating the use of multiple copies of statically stored objects. Specifically, FIG. 6 illustrates a problem that can occur with static storage if a class is copied into multiple independent compilation units. Classes A and A' for A would be "safe" and would not produce different results than if A were used. However, both A and A' have static variables X, and the getNext operation of both classes increments and returns this value. If only class A is used for all calls to getNext, the values returned will be in monotonically increasing order (6, 7, 8 and so on). However, if class A' is substituted for class A, then for some calls to getNext the order of the returned results will not be as desired. That is, if calls are made sequentially to A, then A, then A', then A', the resulting values will be 6, 7, 6, 7. This problem is addressed by the invention.

FIG. 7 depicts a code segment useful in understanding the present invention. Specifically, the code segment 700 of FIG. 7 illustrates a problem that can occur with static storage if multiple copies of a class attempt to share the same static. If there are two copies of the class A, compiled into separate compilation units, the order of analysis of the first copy by the compiler may differ from the order of analysis of the second copy, with the results that their views of static are different. For instance, in the first case the constants that address methods B, SomeMethod and C, AnotherMethod are in one order, while in the second case they are in the opposite order. If one attempts to use a common copy of a static representation for both copies of the calls, one of the static representation copies will reference the address constants in the wrong order and will call the wrong methods.

FIG. 8A depicts a code segment and address space utilization useful in understanding the present invention. Specifically, a source code segment 810 when compiled produces code 820 utilizing static storage 830 as shown. This is the traditional common address space scheme for addressing static storage. In this case the code and static storage contained in a single address space and can all be referenced with absolute addresses encoded in the instructions (or with relative offsets and base registers). No special processing is required in order to address static in this case.

FIG. 8B depicts a reentrant static addressing scheme utilizing the code segment of FIG. 8A. Specifically, FIG. 8B illustrates the traditional reentrant scheme for addressing static storage. In this case a register 850 is specifically loaded to address static storage, and all references 840 to static are indirect via that register 850. This allows there to be multiple copies of static, one for each process sharing the common code address space. Even though the code address space is shared, the various processes run without interfering with each other, since each has its own private copy of static storage.

In many environments the code and static data reside at known offsets in a common address space, such that the absolute address of static storage can be determined and actually compiled into the machine instruction sequence. In other cases a common reentrant image of the machine instruction sequence may be shared by multiple execution environments, so the address of static storage must be supplied to each subroutine via a hidden parameter of some sort. Another similar approach is to pre-load a reserved CPU address register with the address of the static storage area for a compilation unit.

Using the above techniques, or other techniques known to those skilled in the art, the static storage area relevant to a given subroutine or addressable item can be identified.

The present invention functions by dividing categories (or subcategories of the categories) of static items storage into two super-categories: Those categories that are unique to an individual compiled instance of a subroutine, and those categories that are shareable between individual compiled instances, provided that they all reflect the same source version. Note that there may be some items that may be placed into either super-category, as they are not malleable (and hence don't need to be shares) but also do not contain information unique to the particular compiled instance of a subroutine. Such things as the name of the JAVA® Programming language class would fall into this group.

Having divided the above categories into appropriate super-categories, the next step is to establish a scheme for efficiently addressing both super-categories of information. The preferred embodiment of the invention implements a static storage scheme that allows each instance of a subroutine to have its own static storage, rather than a single copy shared across all instances of a given subroutines. Within that static storage, pointers to the information that falls into the shared super-category are maintained.

When a compiler determines that a subroutine (e.g., a JAVA® programming language method or other procedure) should be copied into a compilation unit where it was not already defined, a "clone" copy of the permanent data structures for the containing class is also made. These data structures include primarily the main class structure, the tables of static and instance fields, the table of methods, and the constant pool. (The "virtual method table" does not need to be defined at this time so long as the rules for constructing it are known. Also, the field tables do not need to be unique per method instance and hence do not need to be copied so long as addressability to the originals can be maintained.)

As the subroutine is compiled, the code generation process may create ordinary static storage items (e.g., for literal storage) in the normal fashion. The code generation process may also add or modify entries in the constant pool table for items that need to be resolved at execution time and, as needed, add or modify entries in the set of constant resolution entries for the method being compiled. After a method is compiled, the information necessary to address the method is placed in the copied table of methods.

If a reference to a method is found while compiling another method, and if the reference is of a sort that can be directly bound (e.g., via a branch directly to the target entry point vs. an indirect branch), and if the referenced method is one that has been copied into the current compilation unit as described above, the reference is compiled as a directly bound reference and a constant resolution entry is added to the list of such entries for the referencing method. An indicator in the added constant resolution entry identifies it as corresponding to a copied (i.e., "clone") method.

Figure 18:
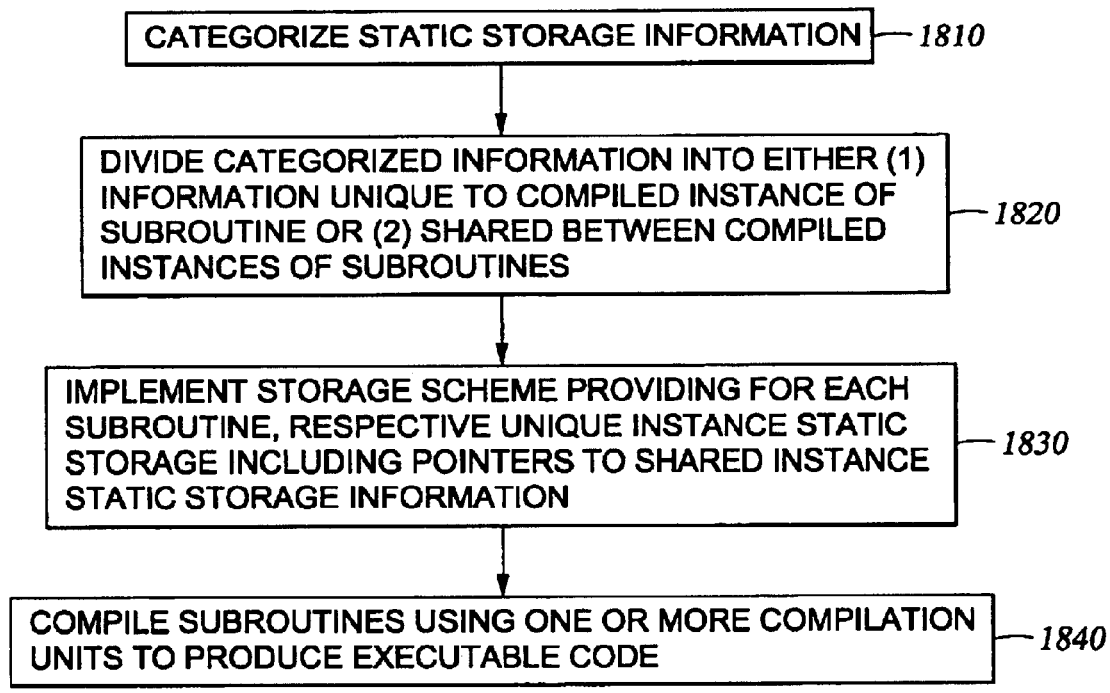
FIG. 18 depicts a flow diagram of a process according to the invention.

FIG. 18 depicts a flow diagram of a process according to the invention. Specifically, the process 1800 of FIG. 18 comprises a high level representation of an embodiment of the invention.

At step 1810, static storage information for each procedure, method, software module or object requiring static storage is characterized.

At step 1820, the categorized static storage information is divided into (1) information unique to compiled instances of subroutines, or (2) information shared between compiled instances of subroutines. That is, at step 1820, the categorized static storage information is broadly divided into shared and non-shared information.

At step 1830, a static storage scheme is implemented that provides, for each subroutine, respective unique instance static storage including pointers to shared instance static storage information.

At step 1840, the subroutines are compiled using one or more compilation units to provide executable code. It is noted that during the compilation process, shared categorized information (as divided out during step 1820) is compiled once and pointers to the compiled and shared static storage information are provided to subsequent subroutines as they are being compiled. In this manner, duplicate compilation of subroutines is avoided, while tight binding of static storage is achieved.

Figure 19:
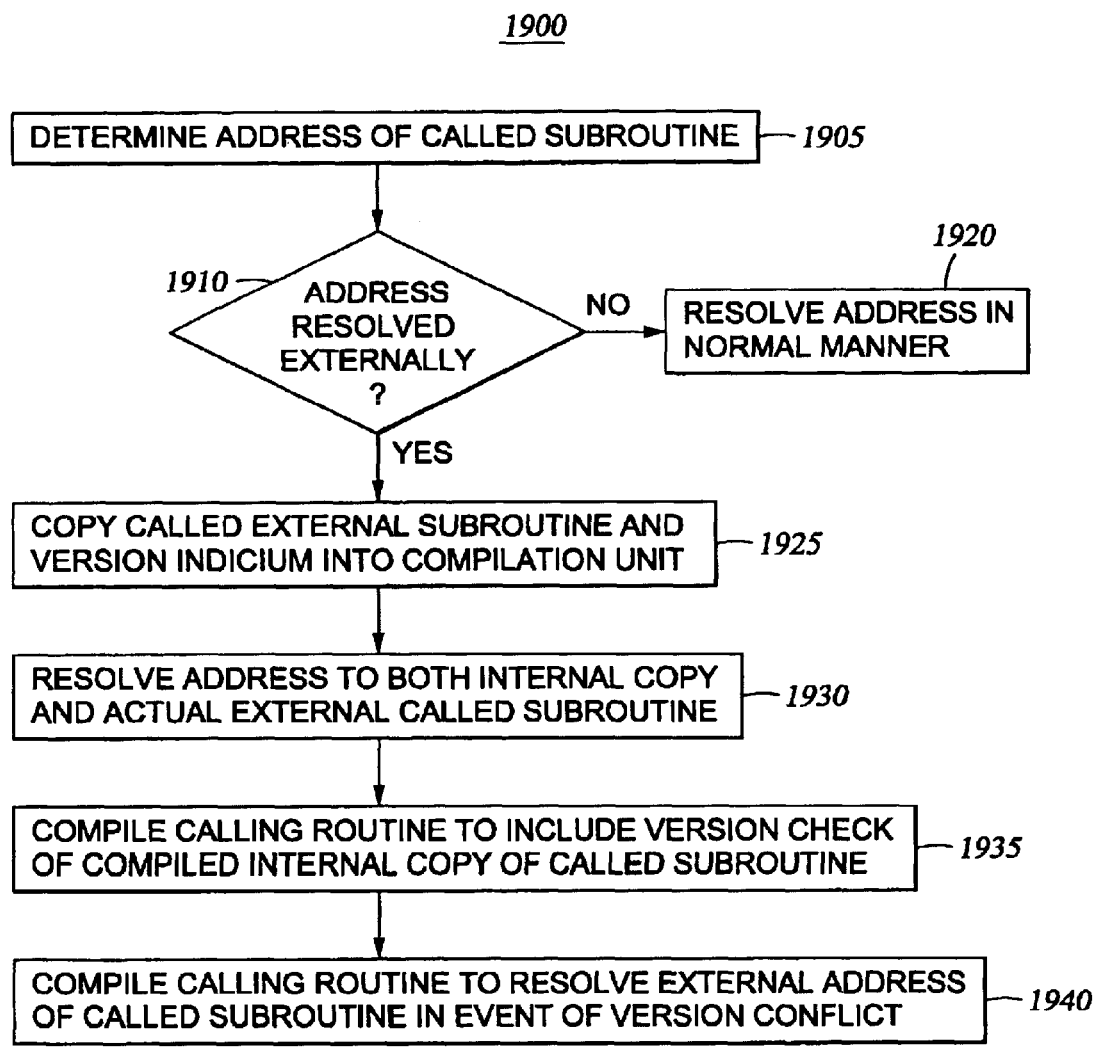
FIG. 19 depicts a flow diagram of a method for compiling an externally resolved subroutine according to an embodiment of the invention.

FIG. 19 depicts a flow diagram of a method for compiling an externally resolved subroutine according to an embodiment of the invention.

At step 1905 an address of a called subroutine is determined. That is, at step 1905 the compiler encounters code indicative of a call to a subroutine or other addressable item and determines whether the address of the subroutine or other addressable item is resolved internally or externally to the instant compilation unit.

At step 1910, a query is made as to whether the determined address is resolved externally. If the query at step 1910 is answered negatively (i.e., an internally resolved address), then the method 1900 proceeds to step 1920 where the address of the called subroutine or other addressable item is resolved in the normal manner. In the case of an externally resolved address, the method 1900 proceeds to step 1925.

At step 1925, a copy of the called external subroutine or other addressable item, along with a version indicium of the external subroutine or other addressable item is copied into the compilation unit. The version indicium comprises at least one of a timestamp, a cyclic redundancy check (CRC) and a version control identifier.

At step 1930, the address of the called external subroutine or other addressable item is defined as, for example, pointers to both the internal copy and actual external version. That is, at step 1930 the compiler defines the address of the copied subroutine (e.g., via in-lining of the subroutine) according to the standard optimizations. The compiler also defines a pointer or offset to the external address used to call the subroutine or other addressable item.

At step 1935, the subroutine being compiled (i.e., the calling subroutine or calling routine) is compiled to include a version check of the compiled internal copy of the called external subroutine or other addressable item. The version check is a step performed at link or execution in which the copy of the externally addressed subroutine or other addressable item is compared to the version of the actual external subroutine or other addressable item.

At step 1940, the calling routine is compiled. That is, at step 1940, the compiler processes the calling routine in a manner providing an alternative execution path that enables execution of the externally resolved called subroutine or other addressable item.

The above general embodiment of the invention depicts the scenario in which the compiler determines which addressable items are to be externally resolved during execution and responsively copies the externally resolved items into the compilation unit, along with a version identifier, such that a subsequent execution of the compiled routine will, prior to executing the called item, check to determine if the copy of the called item is the appropriate version. In the event of the copied and compiled version of the called item not matching the version of the externally referenced called item, the externally referenced called item will be executed instead.

JAVA® Programming Language Implementation

An embodiment of the invention as applied to the JAVA® programming language environment will now be described in more detail. In the case of a typical JAVA® programming language implementation, the information that resides in the static storage accessible to a given subroutine can be roughly categorized as follows:

(a) The main JAVA® programming language class structure, containing such information as the name of the class and its authorization attributes; (b) A table of static fields defined by the class; (c) A table of instance fields defined by the class; (d) The actual static data storage areas; (e) A table of methods actually implemented by this class; (f) A "virtual method table" identifying all virtual methods either implemented or inherited by this class; (g) A constant pool table, containing malleable entries used to address classes, methods, fields, and strings that cannot be absolutely determined at compile time; (h) Constant resolution entries, in lists associated with each method (i.e., each procedure or subroutine) implemented (not inherited) by the class; and (i) Static storage created by the actual code generation process, including, for example, storage for numeric literals that are too large to be placed into a register using an "immediate form" machine instruction.

Figure 9:
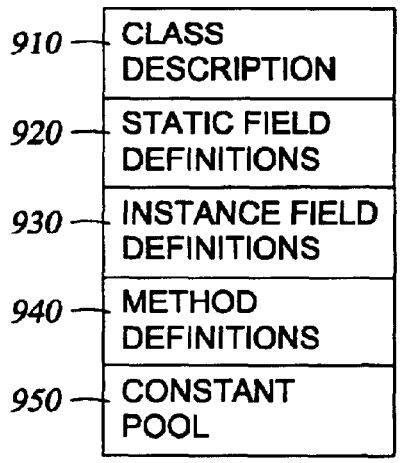
FIG. 9 depicts a data structure representing a JAVA® programming language class file.

FIG. 9 depicts a data structure representing a JAVA® programming language class file 900 including at least a class description field 910, static field definitions 920, instance field definitions 930, method definitions 940 and a constant pool 950. The file contains a general class description, static and instance field definitions (which in practice are merged together with flag bits indicating which type is which), method definitions, and a constant pool. The constant pool centralizes most of the literal string values and external references used within the class, both allowing a more compact representation (due to shared used of the literal values) and providing a convenient prototype for the static storage to be used by the class during execution.

Figure 10:
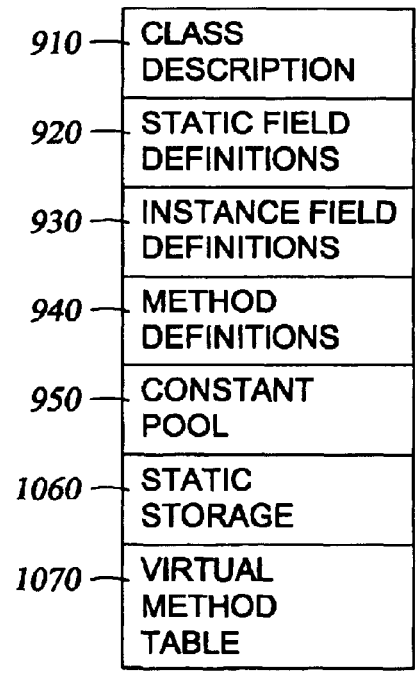
FIG. 10 depicts a data structure representing a loaded JAVA® programming language class.

FIG. 10 depicts a data structure representing a loaded JAVA® programming language class 1000 including the contents (910–950) of the JAVA® programming language class file 900 of FIG. 9, though augmented with additional information such as addresses, offset, and authorities that can be determined once a class is loaded. In addition, the actual static storage (1060) for static items specified in the JAVA® programming language source is allocated, along with a virtual method table (1070). The location in the static storage are indirectly addressed by pointers from the augmented static field definitions (or, in some designs, the static storage for fields can actually be allocated within the augmented static field definition entries). The virtual method table contains a list of all methods belonging to this class, including inherited ones. The order of entries in this table is generally arbitrary, except that inherited methods appear first, and are in the same order as they appear in the class from which they were inherited. This allows the efficient addressing of virtual methods once the name of a method is resolved to an index into the table (an operation that needs to be performed at most once for each call site).

In many cases, (such as the JAVA® programming language implementation on the AS/400 computer system manufactured by International Business Machines Corporation of Armonk, N.Y.), the constant pool is addressed indirectly via an ordered table of pointers. That is, a constant pool vector table contains of an ordered array of pointers, with each pointer addressing the corresponding pool entry. This simplifies the addressing of constant pool entries (as they are not of uniform size), at the expense of an extra level of indirection.

Figure 11:
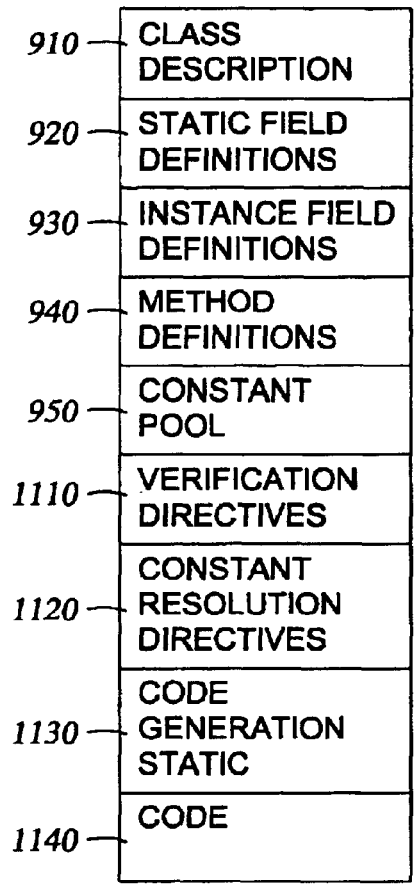
FIG. 11 depicts a data structure representing a compiled JAVA® programming language class.

FIG. 11 depicts a data structure representing a compiled JAVA® programming a data class 1100 such as implemented on the AS/400 computer system. The compiled class structure 1100 comprises the five items (910–950) of the JAVA® Programming language class file 900 of FIG. 9, though augmented by additional information that could be derived during the compilation process. In addition, the compiled JAVA® programming language class structure 1100 of FIG. 11 comprises four additional items, namely, verification directives 1110, constant resolution directives 1120, code generation static storage 1130 and the compiled code 1140.

The verification directives 1110 contain a condensed form of the verification operation that must be done when the class is loaded. The use of these directives avoids the need to re-verify the class then it is loaded, since all inter-call checks that must be performed are encoded in these derivatives.

The constant resolution directives 1120 encode how external references from this class to other classes (and, in some cases, from this class to other methods or fields in this class) are to be resolved.

The "code gen static" 1130 is the static storage produced by the low-level code generation process. This is not needed in all cases, but most code generation schemes need the ability to produce and allow the use of such static in order to handle certain complex operations (such as N-way branches).

The code 1140 is the representation, in machine instructions, of the methods within the JAVA® programming language class. Addressability to the entry points of the methods within this item is recorded in the augmented method table entries.

Also note that, during the compilation process, additional constant pool items may be added to the constant pool. For instance, since the operand passed to an ATHROW JAVA® programming language operation must be a subclass of Throwable, it may be necessary to add a constant for Throwable to the constant pool so that it can be referenced by the verification directives. Also, in the case of references to "cloned" classes as described in this invention, it is usually necessary to add additional class and method constants to the constant pool to represent the "cloned" methods and classes".

FIG. 12 depicts a code segment useful in understanding the invention. Specifically, FIG. 12 depicts an indirect call code segment 1210 and a direct call code segment 1220 as implemented on an AS/400 computer. The value loaded into a register RS is the address of the basic class description structure 1230. Prepended to the basic class description structure is the constant pool vector table 950. Negative offsets from register RS can be used to access entries in this table 950. Entries in this table 950 contain pointers to the actual constant pool entries stored in heap.

In the indirect call case 1210, the constant pool entry for the target method is referenced by using a negative offset from RS (the hardware of the AS/400 supports negative offsets in its instructions) to fetch the pointer to the MethodRef constant pool entry (into register RA in this example). The index of the pointer within the vector table 950 is fixed at compile time, or in the case of constant pool entries that derive directly from the class file, is fixed when the class file is created. Thus a "hard coded" negative offset can be used. Next, the address of the MethodInfo structure (i.e., the address of the method table entry) for the target method is loaded into RB, using base register RA and the known offset from the start of a MethodRef entry to the MethodInfo pointer within that entry. Then, the entry point address of the method is loaded into register RC, using base register RB and the known offset from the start of a MethodInfo entry to the entry point value.

Since the target method's MethodInfo pointer must be passed to the target method as a hidden parameter, it is copied into parameter register zero (RPO). In some cases common register optimizations can be used to avoid this operation by initially loading the MethodInfo pointer into the correct parameter register.

The hardware used on the AS/400 typically requires that the branch address for indirect branch operations be in a special-purpose register. The next step is to copy the entry point address of the target method into target register RT. Other architectures may not require this step. Finally, a BranchAndLinkIndirect operation saves the address of the following instruction as the return address and then branches to the target address, effecting the call operation.

In the direct call case 1220, the MethodRef and Method-Info addresses must be loaded as for the indirect case 1210, and the MethodInfo address must be moved to the parameter register RPO. But there is no need to load the target address or move it to the target address register. Rather, the BranchAndLinkDirect operation transfers control directly to the target method without any indirection.

FIG. 13 depicts a code segment useful in understanding the invention. Specifically, FIG. 13 depicts a code segment 1310 illustrating the virtual call sequence as implemented on the AS/400 computer system.

A register RA is loaded with the pointer to the target method's MethodRef (in the calling class's constant pool by using a known negative offset from a register RS. A register RB is then loaded with the offset (relative to RS)) of the target method's virtual method table entry. It is important to note that this offset will be in the virtual method table of the target method's class, not the calling method's class.

Next a register RC is loaded with the pointer to the target method's base class structure. This value is fetched from the first storage location of the object for which the call is being made, assuming register RO has already been set to address that object. Registers RB and RC are added to produce the address, within the target class's basic class structure, of the virtual method table entry of the target method, and the resulting sum is placed in RD. RE is then loaded with the value addressed by RD—the pointer to the target method's MethodInfo structure.

The remaining steps are essentially the same as for the indirect case, except that registers RE and RF are used in place of registers RB and RC.

Figure 14:
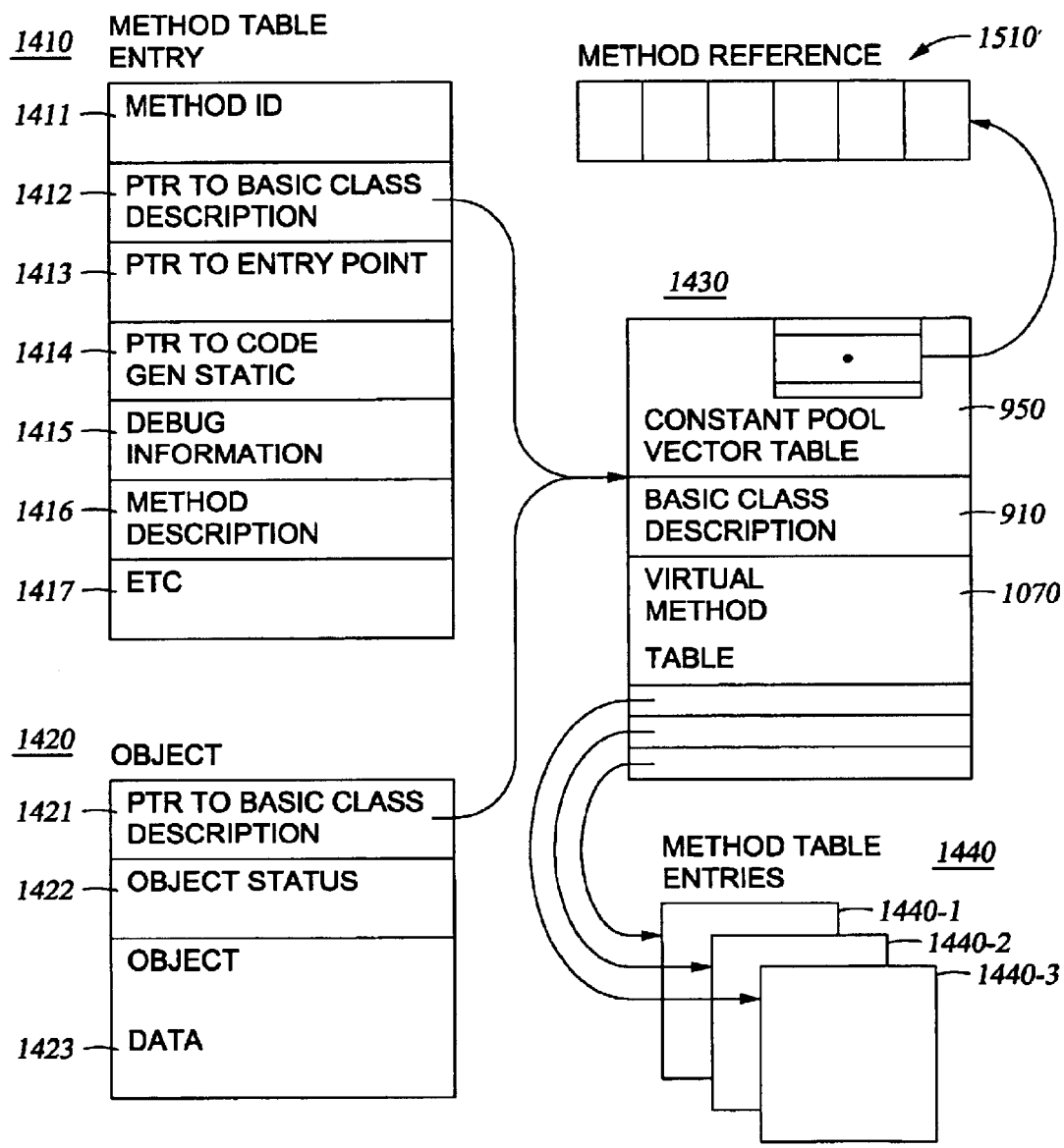
FIG. 14 depicts a graphical representation useful in understanding the invention.

FIG. 14 depicts a graphical representation useful in understanding the invention. Specifically, FIG. 14 depicts the block diagram of some of the data structures involved in call sequences. A method table entry 1410 (or MethodInfo) contains method identification 1411, a pointer to the basic class description 1412 of the containing class 1430, a pointer to the method's entry point 1413, a pointer to the method's code gen static 1414 (i.e., static storage generated by the low-level code generation process), debug, info, information descriptive of the method 1416 (authorities, etc,) and other miscellaneous information 1417.

An object 1420 contains a pointer of the basic class description 1421 of the class of which the object is an instance, some object status information 1422 (e.g., lock state), and the actual object data 1423 corresponding to the object fields declared in the JAVA® programming language source.

The basic class description 910—, as described previously, contains several descriptive pieces of information for the class 1430, including pointers to other areas containing the remaining full class description. Prepended to the front of the basic class description is the constant pool vector table 950, consisting of pointers to various types of constant pool entries. The most important of these entries are described below with respect to FIG. 15. One of the constant pool entry types is the MethodRef 1510, an entry which corresponds to an externally referenced method and which contains, indirectly, the information required to reference the method.

Postpended to the basic class description 910 is the virtual method table 1070 of the target method's class, not in the calling method's class. This is a table of pointers to method table entries 1440 (MethodInfo entries 1440-1, 1440-2, and 1440-3) that reference the methods of the class 1430. The entries 1440 are ordered with those inherited from superclasses first, and in the same order as they appear in the table of the superclass. This allows efficient virtual method calls to be made without first having to look up the method name in the particular class whose object is being used to base the call.

Figure 15:
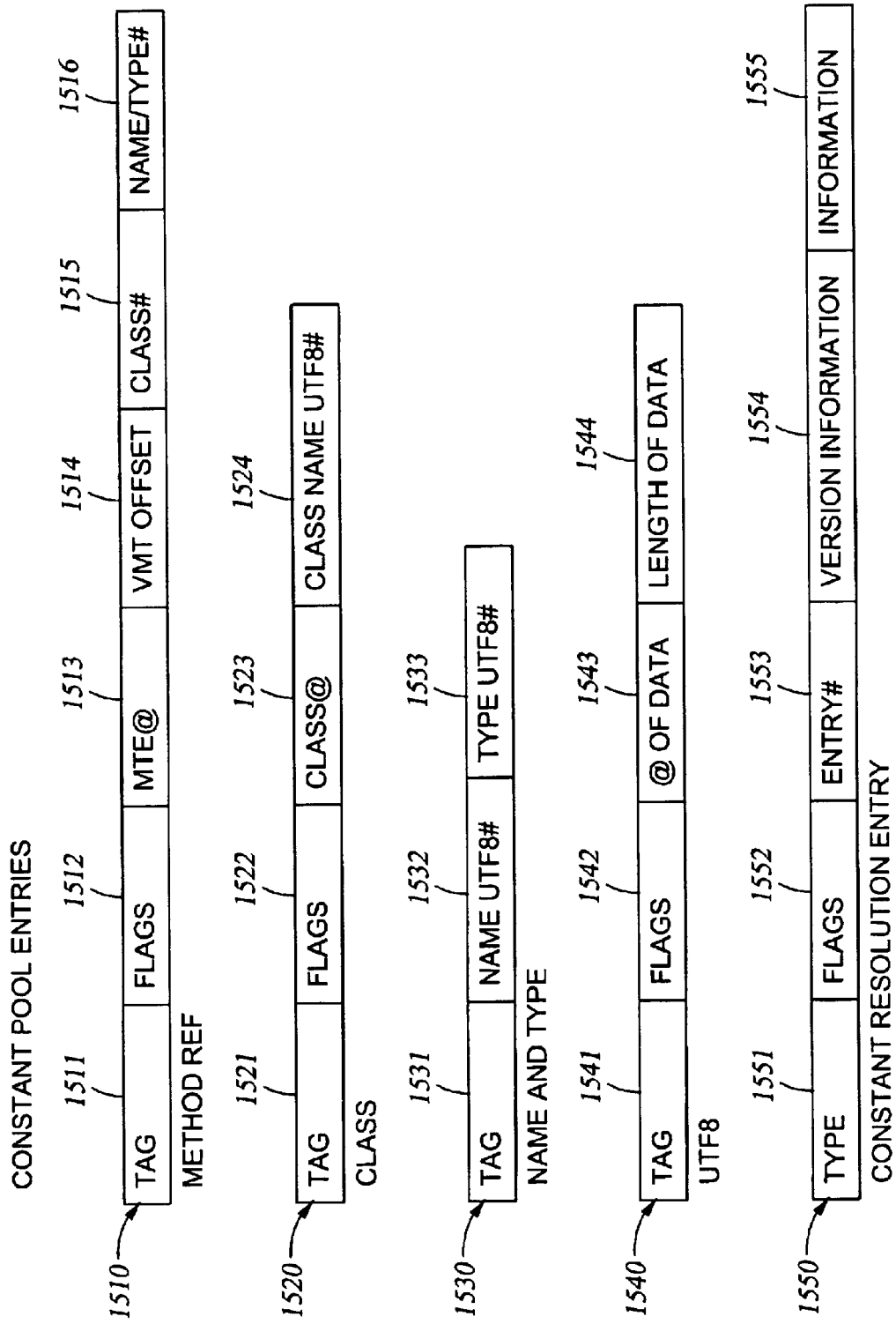
FIG. 15 depicts a plurality of data structures illustrating constant pool entries and constant resolution ntries.

FIG. 15 depicts a plurality of data structures illustrating constant pool entries and constant resolution entries. Specifically, the constant pool entries 950 depicted in the preceding figures may include MethodRef entries 1510, class entries 1520, NameAndType entries 1530 and UTF8 entries 1540. FIG. 15 also depicts a table of Constant Resolution Entries 1550.

FIG. 15 depicts the structure of some of the constant pool entries, along with the structure of the constant resolution entry. In those cases where a "#" symbol is shown, such as the "Class#" field in the MethodRef type, the value in the entry is the index into the constant pool of an entry which contains the desired information.

The MethodRef entry 1510 contains a tag 1511 (identifying it as a MethodRef entry), some bit flags 1512, a pointer to the method table entry (MethodInfo) of the method as resolved 1513 (but not necessarily to method table entry of the method that should be called in the virtual call case), the offset from the start of the method's basic class structure to the virtual method table entry corresponding to the method 1514 (valid only when the method is virtual), and index values identifying the class 1515 and name/signature 1516 of the method.

The constant resolution entry contains a tag 1551 identifying the sort of resolution to be performed, some bit flags 1552 (most notably one that determines if the entry references a clone method), the constant pool table entry number 1553 of the corresponding constant pool table entry, some optional version info 1554, and debug info 1555 linking the constant resolution entry to a particular code location so that the reason for the existence of the entry can be identified. If the JVM execution model included code patching of resolved references, the entry would also contain the address of the code to be patched.

The optional version info 1554 in the constant resolution entry 1550 identifies version checks that must be performed for the resolution to be valid. For instance, the reference in question may have been compiled with the knowledge that the field being referenced is always at offset 20 in the object. If this is the case, then version information in the constant resolution entry states that if the field is not at the expected offset than an error condition exists. (In most cases such errors are handled automatically by switching to a different, less optimized version of the code).

The class entry 1520 contains an identification tag 1521, various flags 1522, a pointer to the base class of the method as resolved 1523 and an index 1524 into the constant pool for the class name UTF8.

The name and type entry 1530 contains an identification tag 1531, an index 1532 into the constant pool indicating the name UTF8 and an index 1533 indicating the type UTF8.

The UTF8 entry 1540 includes an identification tag 1541, various flags 1542, a pointer to the appropriate data 1543 and an indication of the length of the data 1544.

Figure 16A:
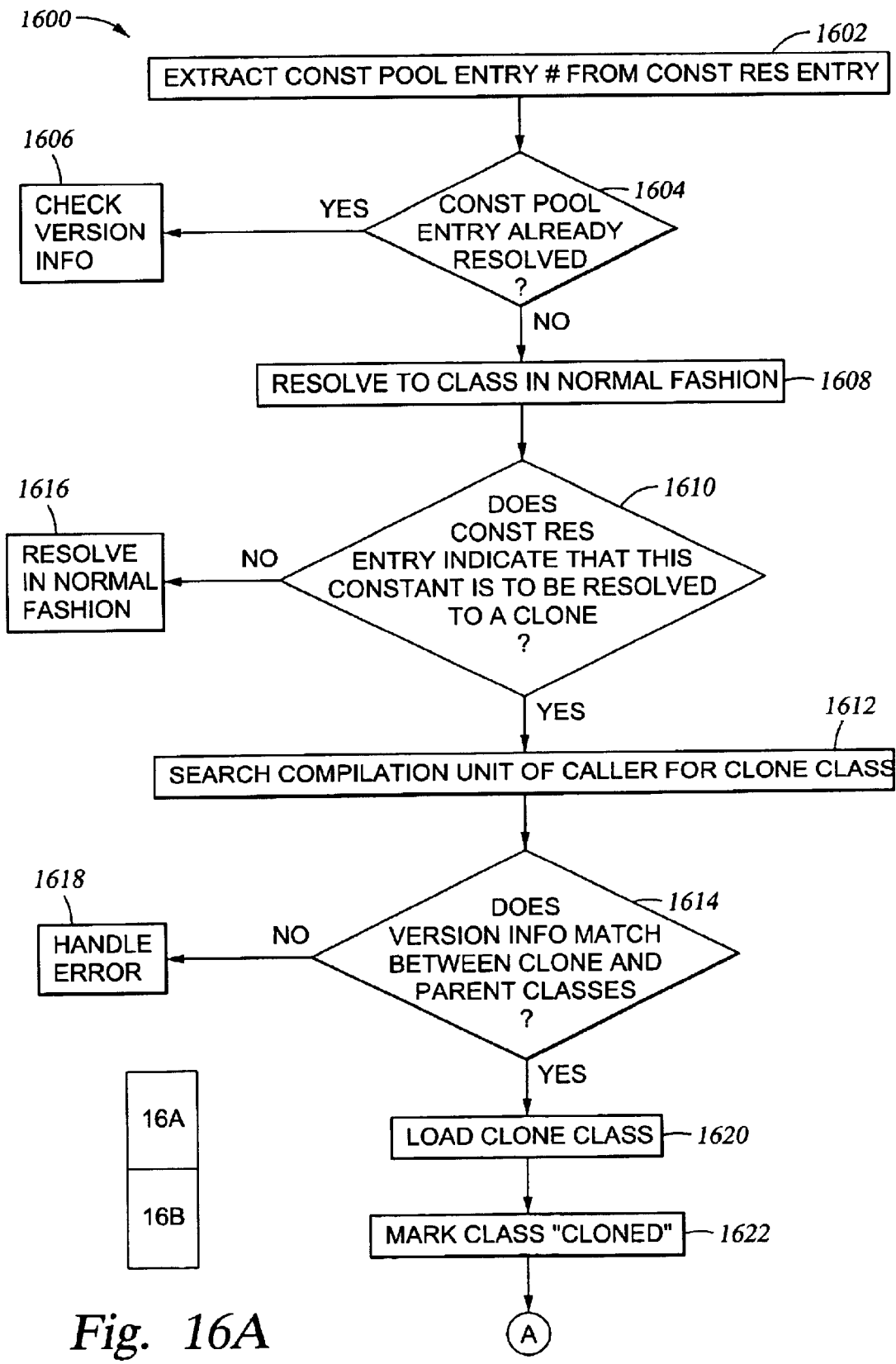
FIGS. 16A and 16B (collectively referred to as FIG. 16) depict a flow diagram of a constant resolution process.
Figure 16B:
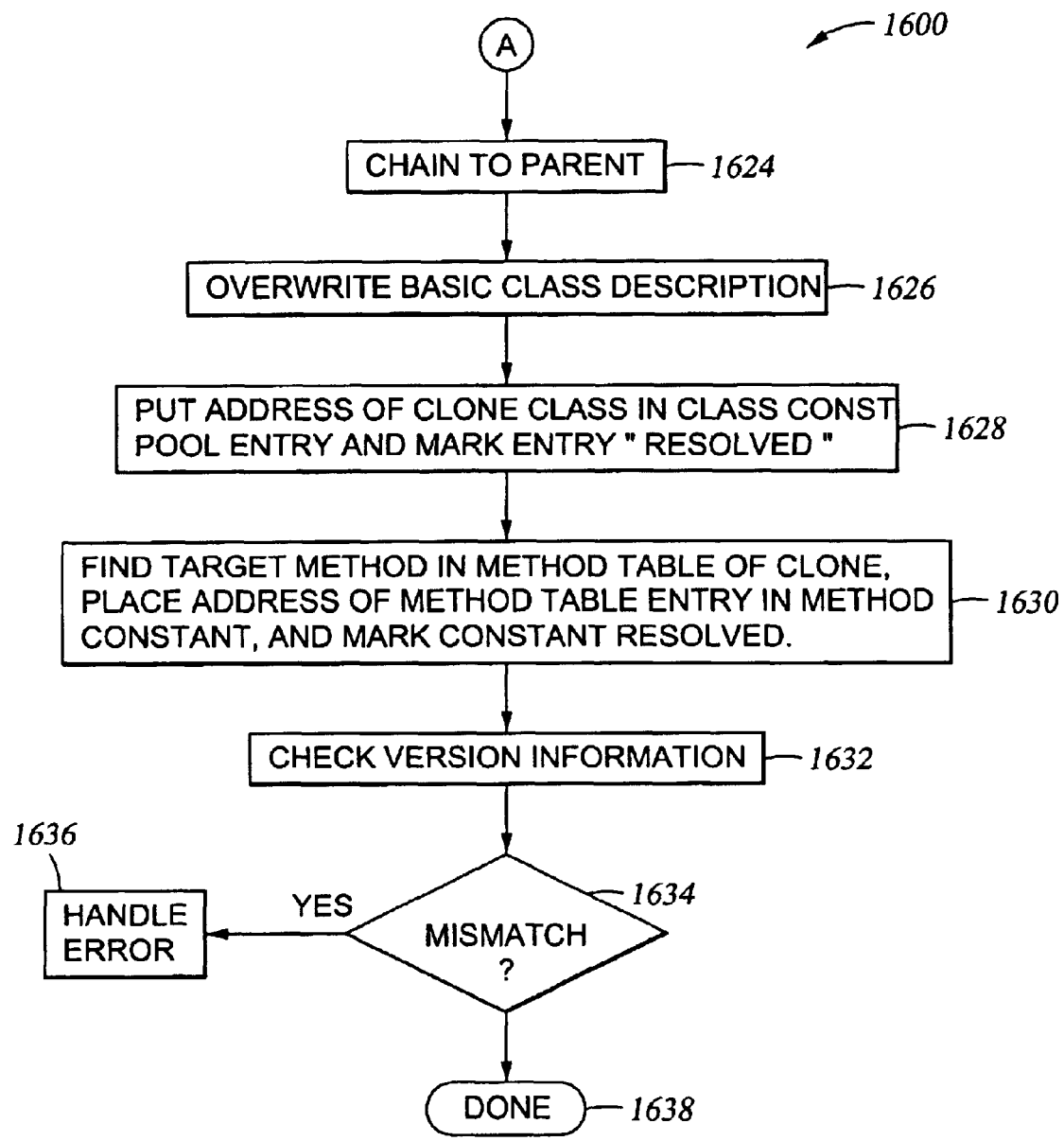

FIG. 16 depicts a flow diagram of a method according to the invention. Specifically, FIG. 16 depicts a constant resolution process for a MethodRef that may correspond to a clone method. The method 1600 of FIG. 16 is entered when a set of constant resolution entries are resolved as a result of entering another procedure for the first time.

At step 1602, the constant pool entry number is extracted from the constant resolution entry and used to address the constant pool entry (e.g., a MethodRef).

At step 1604, a query is made as to whether the constant pool entry has already been resolved. If the query at step 1604 is answered affirmatively, then the version information is checked at step 1606. That is, if the entry is already marked Resolved then the resolution operation is essentially complete except for the checking of version information in the constant resolution entry against the actual environment existing at execution time. If the query at step 1604 is answered negatively, then the method proceeds to step 1608. At step 1608, the class of the referenced method is identified and its constant pool entry is resolved in the normal manner. That is, at step 1608 the class loader is called to either load the class or find the already-loaded class by the indicated name.

At step 1610, a query is made as to whether the constant resolution entry indicates that this constant is to be resolved to a clone. That is, a query is made as to whether the resolved constant pool entry corresponds to a cloned class. If the query at step 1610 is answered negatively, then the process proceeds to step 1616, where the method is resolved in the normal fashion by looking up the method in the class found at step 1608. If the query at step 1610 is answered affirmatively, then the process 1600 proceeds to step 1612. At step 1612, the compilation unit of the calling class is searched to find the permanent representation of the cloned class. Such a permanent representation of the cloned class must be present if the constant resolution entry indicated the clone.

At step 1614, a query is made as to whether the version information between the clone and parent classes matches. For example, recorded time stamps from the class files may be examined in both cases to determine if they are the same. If the query at step 1614 is answered negatively, then the process 1600 proceeds to step 1618 where an error handler is invoked. Otherwise, the process 1600 proceeds to step 1620.

The above-described steps of the process 1600 establish that a constant pool entry provided by a calling method is to be resolved to a clone class. The remaining steps within the process 1600 load and modify the clone class such that it represents the proper amalgam of the clone and parent classes. For example, a number of fields in the clone class are overlaid to address the corresponding structures of the parent class. Importantly, the constant pool vector table of the clone is not overlaid.

At step 1620, the clone class is loaded. At step 1622, the class is marked as "cloned." At step 1624, the marked class is chained to the parent. At step 1626, the basic class description is overwritten to include the appropriate clone class entries. At step 1628, the address of the clone class is placed in the class constant pool entry and the entry is marked as "resolved." At step 1630, the target method in the method table of the clone is found and the address of the method table entry is placed in the method constant. The method constant is then marked as resolved.

At step 1632, version information associated with the class is checked. At step 1634, a determination is made as to whether a version information mismatch exists. The error is handled 1636 if the mismatch exists. Otherwise, the process is done 1638.

Figure 17:
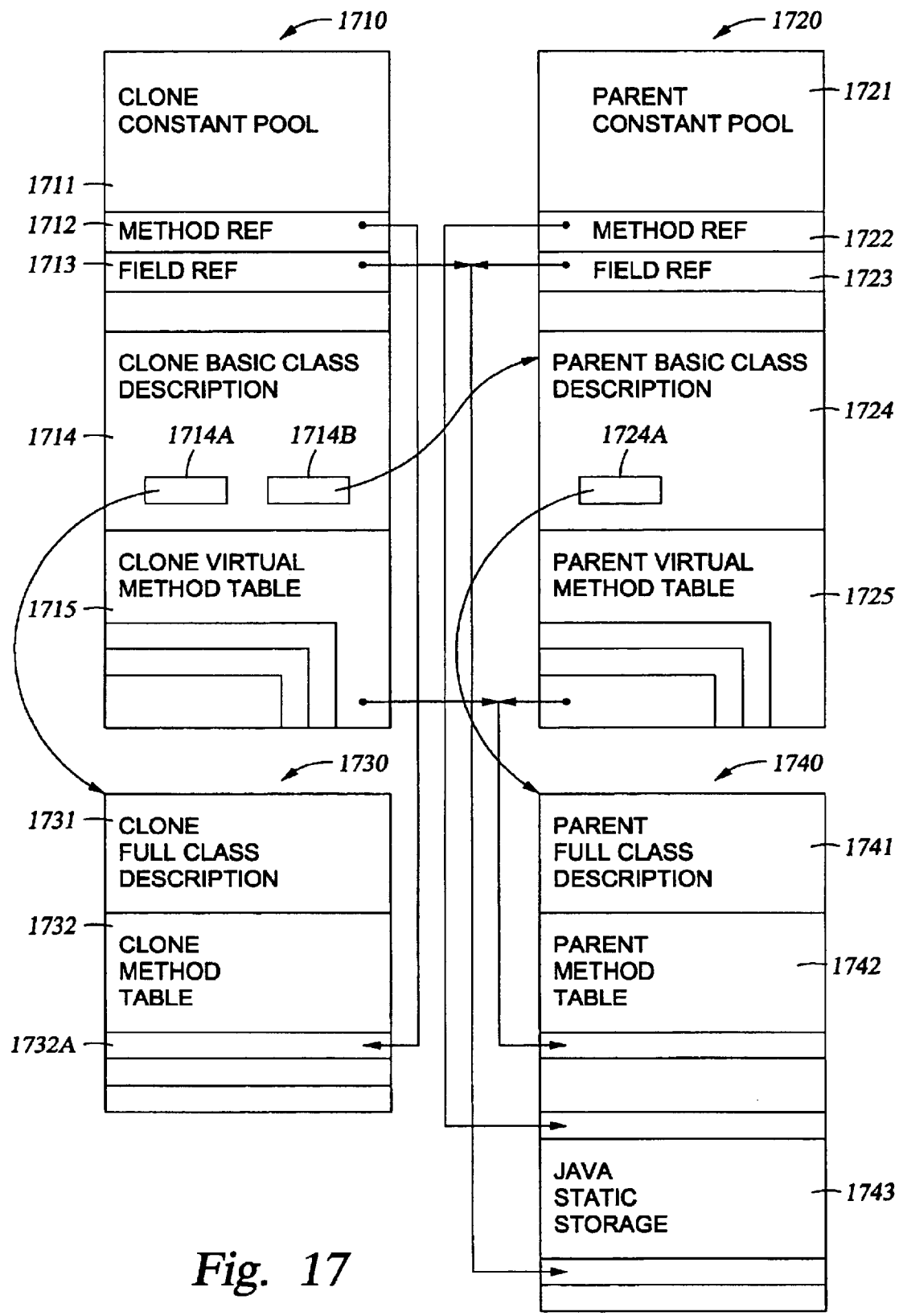
FIG. 17 depicts a graphical representation useful in understanding the invention.

FIG. 17 depicts a graphical representation useful in understanding a JAVA® programming language realization of the present invention. Specifically, FIG. 17 depicts a clone basic class description 1710, a parent basic class description 1720, a clone full class description 1730 and a parent full class description 1140.

The clone basic class description 1710 includes at least a clone constant pool 1711, a MethodRef 1712, a FieldRef 1713, a clone basic class description 1714 and a clone virtual method table 1715. The parent basic class description includes at least a parent constant pool 1721, a parent method reference 1722, a parent field reference 1723, a parent basic class description 1724 and a parent virtual method table 1725. The clone full class description 1730 includes at least a clone full class description 1731, a clone method table 1732. The parent full class description 1740 includes at least a parent full class description 1741, parent method table 1742 and a JAVA® programming language static storage 1743. It will be appreciated by those skilled in the art that only portions of the various data structures are depicted.

It is noted that the clone class does not include static storage. Rather the clone class references the static storage 1743 of the parent class 1740. Also, while a clone virtual method table 1715 is not necessary, the presence of such a table enables certain optimizations when a clone method is calling virtual methods of its own class.

FIG. 17 also depicts various linkages between each basic class description 1710, 1720 and the corresponding full class description 1730, 1740, and a pointer from the clone basic class 1710 to the corresponding parent structure 1720, and other linkages.

Specifically, it is noted that the MethodRef 1712 points to a method 1732A within the clone full class description 1730. The entries in the clone virtual method table 1715 do not address clone methods but rather methods of the parent (or the parent's ancestors), as indicated by the link to the parent method table 1742.

The clone basic class description 1714 includes a first linkage 1714A to the clon full class description 1730, and a second linkage 1714B to the parent basic class description 1724. The parent basic class description 1724 includes an entry 1724A having a linkage to the parent full class description 1740. The field references 1713 and 1723 of, respectively, the clone basic class description 1710 and the parent basic class description 1720 have linkages to the JAVA® programming language static storage 1743. The method reference 1722 has a linkage to the parent method table 1742.

The clone basic class description 1714 includes a first linkage 1714A to the clone full class description 1730, and a second linkage 1714B to the parent basic class description 1724. The parent basic class description 1724 includes an entry having a linkage to the parent full class description 1740. The field references 1713 and 1723 of, respectively, the clone basic class description 1710 and the parent basic class description 1720 have linkages to the Java® static storage 1743. The method reference 1722 has a linkage to the parent method table 1742.

Exemplary Framework

Once a compilation unit has been created using methods and classes copied as described above, a suitable execution environment for the methods and classes must be created. The framework for doing this may be provided as follows.

Prior to execution of the compiled code, the class for the method that will be initially referenced must be "loaded." This operation consists of finding the class data structures corresponding to that class and making them ready. This basic process is described in greater detail in "The JAVA® programming language Virtual Machine Specification—Second Edition" (ISBN 0-201043294-3). The basic process is modified herein in that rather than loading the class data structures directly from a class file (and interpreting them anew), the pre-processed permanent class data structures associated with the compiled code are used. This concept is described in more detail in commonly assigned U.S. patent application Ser. No. 09/024,111, filed Feb. 17, 1998 and incorporated herein by reference in its entirety. Briefly, native program code is associated with an executable file containing platform-independent code, e.g., a JAVA® programming language class file. Given that program code associated with a file attribute is typically transparent to conventional JAVA® programming language interpreters, the performance of a JAVA® programming language or other platform-independent computer program is enhanced for operation on a particular platform while maintaining platform-independence. That is, by associated alternate program code with an executable file using a file attribute, the alternate program code is more transparent to the user, as well as to conventional execution modules that are not specifically configured to detect and execute the alternate program code. Moreover, system write access is often not required for a user, so that the integrity of the original executable program code can be protected. Thus, alternate program code is associated with an executable file using a file attribute so that the alternate program code may be retrieved and executed in appropriate circumstances.

After the class is loaded, and before the instructions of the initial method can be executed, resolution must be performed for any tightly-bound references called out in the initial method. The required resolution operations are identified via the constant resolution entries described earlier. During the resolution operation, several processes are performed as follows. First, the constant pool Item which references the tightly-bound references is resolved. Second, for string constants, the string is constructed and "interned" and the address of the string is made available to the compiled code. Third, for instance fields whose offset has been tightly bound into the compiled code, the expected offset is compared to the offset as determined by the class loader, and an error is detected if these do not match. Fourth, for methods whose entry points have been tightly bound into the compiled code, the structure within the compilation unit that identities each such method and describes its characteristics (i.e., the "permanent method table entry") is located and several operations are performed. First, the version of the class to which the resolved-to method belongs is compared to the version of the class that was copied during the compilation process. If the versions do not match then an error is detected. Second, addressability to the static storage of the target JAVA® programming language method is established so that it can be passed as a hidden parameter when the target JAVA® programming language method is called. Third, the first and second resolution operations are recursively performed for tightly-bound references from the target JAVA® programming language method.

The above-described resolution operation can be triggered several ways. The most convenient approach is to replace the pointer to the entry point of the method with a pointer to a resolution routine. After the resolution routine has been executed once, then the correct pointer to the method entry point is restored. Using this technique, the above resolution operations are recursively performed for tightly-bound references from the target JAVA® programming language method. That is, since tightly-bound calls do not operate indirectly through the JAVA® programming language method pointer, the corresponding initialization of the target method will not occur unless done upon entry to the calling method. Implementations using different techniques to trigger the resolution process do not necessarily require the recursive resolution operation to be performed.

When the JAVA® programming language method begins execution, it is passed, via a hidden parameter, addressability to a runtime version of its entry in the containing class's method table. This serves as the "basic static storage" of the method. The runtime version of the method table entry contains, directly or indirectly, addressability to all other static data items. In particular, it contains addressability to a subset of the runtime class data structure fields, comprising a fixed-length basic data structure, a prepended constant pool vector table for the class and a postpended virtual method vector table for the class.

The fixed-length basic data structure. In the current implementation these fields represent a direct copy of the first portion of the full runtime class data structure with minor modifications. While not necessary to the invention, this allows the full and subset structures to be used interchangeably in some circumstances. The subset structure contains, among other things, a pointer to itself, a pointer to the full structure, a pointer to the JAVA® programming language object of class java.lang.Class that represents the class in JAVA® programming language code, and the offset of the first instance field (beyond superclass fields) in an object of this class. Together with the following two items this structure provides all of the addressability that may be required by the executing JAVA® programming language code, and a single pointer to the start of this fixed-length structure serves to address all three items.

The prepended constant pool vector table for the class comprises, illustratively, a table of pointers to constant pool items. Since references to this table are from code that was compiled simultaneously with the definition of the table, references to the table can be made via absolute negative offsets, even though the table is arranged in increasing address order with the last (highest index) element of the table immediately adjacent to the start of the fixed-length basic runtime class data structure.

The postpended virtual method vector table for the class comprises, illustratively, table of pointers to the runtime method table entries for virtual methods of the class, including pointers to inherited methods.

The method table also contains the address of the entry point to the method, addressability to static storage created by the code generation process, addressability to debugged data structures for the method, various items useful in debugging or direct interpretation of the bite codes of the method and other items descriptive of the method that are useful in checking authorizations, handling exceptions and performing other support operations.

The runtime version of the method table entry contains addressability to the fixed-length basic class data structure of the corresponding method and the constant pool vector table of the class referencing a constant pool item consists of the following operations.

Referencing a constant pool item comprises the following steps: (1) if not already loaded, loading the pointer (from the current method's runtime method table entry) to the fixed-length basic class data structure; (2) loading the pointer to the constant pool entry from the constant pool vector table (using, for example, a negative offset relative to the start of the fixed-length basic class data structure); and (3) referring to the constant pool entry addressed by this pointer. If the referred to constant pool entry is of a type which may not be already resolved, a status indicator is tested to determine if the referred to constant pool entry has been resolved. If not resolved, the runtime resolution routine appropriate to the type of constant pool entry is invoked.

Executing a virtual method call consists of the following operations: (1) locating and, if necessary, resolving the constant pool entry that addresses the corresponding formal method, using the procedure described above; (2) retrieving from the constant pool entry the virtual method index of the target method; (3) Retrieving from the object whose method is being called the pointer to the fixed-length basic class data structure for that object's class; using the virtual method index loaded from the constant pool entry to index into the vector table of pointers to runtime method table entries postpended to the object's fixed-length basic class data structure; (4) fetching from the runtime method table entry so located the entry point address of the target method; and (6) invoking the target method, passing the address of the runtime method table entry as a hidden parameter.

Modifications to Framework

The current invention can be implemented via modifications of the above-described framework mechanism as follows.

When, during the processing of constant resolution entries for a method (prior to first entry to that method), an entry is encountered which is marked to indicate it is a reference to a copied ("cloned") method, the class for the reference is initially resolved in a normal fashion. That is to say, the JAVA® programming language class loader mechanism is invoked to locate the class in the "classpath" associated with the execution environment. If no such class is found then an error reported in the normal fashion. (Note that such an error may in some cases be recorded and then deferred in order to assure conformant operation of the JAVA® programming language execution environment.) If such a class is found then it is loaded via the usual mechanism as described earlier.

If the class is successfully located and loaded, then a search of the compilation unit containing the referencing method is performed. This search locates a copied class by the same name. Failure to locate the copied class would indicate corruption or incorrect construction of the compilation unit and would normally result in an immediate fatal error.

The class located via the class loader mechanism is compared to the class found in the current compilation unit. They must have identical version identification information (or, if different, must be identified as equivalent via some implementation-specific and perhaps manually managed set of version control facilities). If they do not satisfy this version equivalency test then an error condition is returned indicating that a version incompatibility occurred. (The handling of such an error condition will be described later.)

If the required copied class is found in the current compilation unit and its version satisfies the equivalency test, then it is loaded in a fashion similar to the loading of a regular class. However, there are some differences in the loading process used for copied classes vs those used for original classes. Specifically, an indicator is set in the main copied class runtime data structure indicating that it is a "cloned" class; the main copied class runtime data structure is chained to the main runtime data structure for the normally-loaded ("parent") class; and the subset runtime data structure of the "cloned" class is overwritten with a copy of the subset runtime data structure of the "parent" class.

The above overwriting includes the fixed portion of the structure, not the postpended virtual method vector table or the prepended constant pool vector table. However, since the postpended virtual method vector table (or the "clone") will not be referenced for ordinary virtual method resolution, the table can be updated via the above copy operation. A pointer to the "cloned" class's main runtime data structure is set into the subset structure (using a pointer location unique to this purpose), and some other pointers are similarly set to address clone structures. It should be noted that the "pointer to self" in the "clone" subset data structure now points to the "parent" subset data structure.

Once the copied class has been successfully loaded, the runtime method table entry within the copied class's runtime structures that corresponds to the target copied method is identified and a pointer to it is placed in the constant pool entry for that method in the referencing class. The constant pool entry is then marked as having been resolved. Thus the runtime method table entry that will be passed as a hidden parameter on the method call will be the entry corresponding to the copied method.

The net effect of the above process is that the copied ("cloned") method will be invoked if tightly bound to (e.g., via a direct branch), but indirect references (e.g., true virtual method calls) to the same conceptual method will result in the invocation of the "parent" version of the method.

Other effects within the context of the modified framework are also realized. For example, a copied method, when invoked, will be passed a pointer to the correct (i.e., copied class) version of the corresponding runtime method table entry.

Since the copied method's runtime method table entry contains a pointer to any static storage generated by the code generation process, the copied method will be supplied with the appropriate version of that static storage.

Since the copied method's runtime method table entry contains a pointer to the subset runtime data structure of the corresponding copied class, and since the constant pool vector table prepended to this structure is the one corresponding to the copied class, the copied method will have access to the appropriate version of the constant pool.

Since the copied method's runtime method table entry contains a pointer to the subset runtime data structure of the corresponding copied class, and since there is a special pointer in that structure that addresses the full runtime data structure of the copied class, the constant resolution entries from the copied class can be referenced when needed to pre-resolve method references.

Since the copied method's runtime method table entry contains a pointer to the subset runtime data structure of the corresponding copied class, and since the pointer in this structure that purports to point at the full runtime data structure of the class in fact points at the "parent" class's structure (because the "clone" subset structure was overwritten with the corresponding structure from the "parent"), operations that query attributes of the current method's class will in fact reference the "parent" class transparently. This includes references to static fields. Since virtual method calls are performed via virtual method vector table postpended to the subset runtime data structure of a class, and since, in a virtual call, this structure is always referenced using the subset runtime data structure pointer fetched from an object header, and since such a pointer is always a pointer to the "parent" class's structure, even when that class has "clones", virtual calls always reference the methods in the "parent" class, not the clone.

Since the only entry to a "clone" method is via a bound reference (direct branch), the "clone" method can be identified to the code generation process as having no external references. This in some cases allows the code generator to perform additional optimizations on it, and, in the case where all references to the method are inlined, allows the code generator to delete the non-inlined version of the "clone" method entirely.

Error Handling

In the above-described modified framework, there exist situations where errors may be detected, directly or indirectly, while performing the "resolution operations" prior to entry to a method. Such errors, if allowed to stand, affect the usability of the overall system and potentially compromise the system compatibility. Therefore, a way to recover from such errors (such as a mismatch in versions between "parent" and "cloned" classes) is of considerable value. Using the mechanism described above, this recovery can be accomplished transparently and with a minimum amount of overhead.

A JAVA® programming language method containing tightly bound references and all the methods that it is tightly bound to, and all the methods that those methods are tightly bound to, etc, comprise a directed graph (that may contain cycles). Whenever a method is entered for the first time via an indirect branch, the graph so defined for that method is walked (taking care to avoid infinite recursion in the case of cycles) and the appropriate "resolution operations" are applied to all the methods in the graph.

If any resolution operation reports an error, then the associated method is marked as in error. If any method is tightly bound to a method that is marked in error, then the referencing method is marked as in error.

Due to the possibility of cycles in the graph, at least one more walk of the graph is required to fully propagate error information. If, after all error information is fully propagated, the method at the initial entry to the graph is not marked in error, the pointer to the method (which temporarily contained the address of the resolution logic used to perform this sequence) is updated to point to the entry point of the actual method.

If, after all error information is fully propagated, the method at the initial entry to the graph is marked in error (and if recovery from such an error is the action desired by the user as indicated by settings within the compilation unit or the runtime environment), then an alternate version of the method is used instead. Further, the address of that alternate version is placed in the pointer to the method that is used by indirect calls.

The alternate method may comprise one or more of the following.

(1) A version of the method compiled (either previously or when required) without any tightly bound references (other than those that are, e.g., within the same class and hence known to be "safe" from the sort of error being considered).

(2) The interpreted version of the method. In this case the address of the interpreter entry point is placed in the pointer to the method that is used for indirect calls, such that when entered the interpreter will be able to access the runtime method table entry that was passed as an implicit parameter and locate the bytecode stream to be interpreted.

(3) A version of the method created by a "Just In Time Compiler" (JITC).

(4) A version of the method compiled on demand to omit just those references which were found to be in error.

Once resolution has been performed and the address of the method (original or alternate) has been stored in the pointer to the method, an indirect branch through that pointer can be performed to enter the method in the normal fashion.

While the foregoing is directed to the preferred embodiment of the present invention, other and further embodiments of the invention may be devised without departing from the basic scope thereof, and the scope thereof is determined by the claims that follow.

What is claimed is:

1. A framework for loading class data structures prior to execution and for resolving called Java® methods, said framework preferentially resolving said called Java® methods as cloned versions of Java® methods within a compilation unit common to a calling Java® method, said framework resolving respective called Java® methods outside said common compilation unit in the event of a version conflict between said respective cloned and external Java® methods.

2. The framework of claim 1, wherein said version conflict is determined with respect to at least one of a timestamp, a cyclic redundancy check (CRC) and a version control identifier.

3. The framework of claim 1, wherein said internal constant resolution entries are compiled to produce in-line executable code.

4. The framework of claim 1, an executing Java® method is provided addressability to a runtime version of its entry in a container class method table.

5. The framework of claim 2, wherein if a constant pool entry provided by said calling Java® method is to be resolved to a clone class, said framework performs the steps of:

loading said clone class; and modifying said loaded clone class to represent the respective clone and parent classes for said constant pool entry.

6. The framework of claim 5, wherein said stop of modifying comprises the steps of overlaying a plurality of fields within said clone class to represent corresponding structures of said parent class.

7. The framework of claim 5, wherein a determination of whether said constant pool entry provided by said calling Java® method is to be resolved to a clone class is made by performing the steps of:

extracting a corresponding constant pool entry pointer;

resolving the constant pool entry to its class; and determining if the constant pool entry has been resolved to a clone class.

* * * * *

UNITED STATES PATENT AND TRADEMARK OFFICE
CERTIFICATE OF CORRECTION

| | | |
|---|---|---|
| PATENT NO. | : 6,810,519 B1 | Page 1 of 2 |
| APPLICATION NO. | : 09/675620 | |
| DATED | : October 26, 2004 | |
| INVENTOR(S) | : Daniel Rodman Hicks | |

It is certified that error appears in the above-identified patent and that said Letters Patent is hereby corrected as shown below:

22. (Currently Amended) A computer readable medium, comprising a framework for loading class data structures prior to execution and for resolving called Java® object-oriented programming environment methods, said framework preferentially resolving said called Java® object-oriented programming environment methods as cloned versions of Java® object-oriented programming environment methods within a compilation unit common to a calling Java® object-oriented programming environment method, said framework resolving respective called Java® object-oriented programming environment methods outside said common compilation unit in the event of a version conflict between said respective cloned and external Java® object-oriented programming environment methods.

23. (Currently Amended) The computer readable medium framework of claim 22, wherein said version conflict is determined with respect to at least one of a timestamp, a cyclic redundancy check (CRC) and a version control identifier.

24. (Currently Amended) The computer readable medium framework of claim 22, wherein said called object-oriented programming environment methods are related to internal constant resolution entries items that are compiled to produce in-line executable code.

25. (Currently Amended) The computer readable medium framework of claim 22, wherein an executing Java® object-oriented programming environment method is provided addressability to a runtime version of its entry in a container class method table.

26. (Currently Amended) The computer readable medium framework of claim 23, wherein if a constant pool entry provided by said calling Java® object-oriented programming environment method is to be resolved to a clone class, said framework performs the steps of:
    loading said clone class; and
    modifying said loaded clone class to represent the respective clone and parent classes for said constant pool entry.

27. (Currently Amended) The computer readable medium framework of claim 26, wherein said step of modifying comprises the steps of overlaying a plurality of fields within said clone class to represent corresponding structures of said parent class.

UNITED STATES PATENT AND TRADEMARK OFFICE
CERTIFICATE OF CORRECTION

PATENT NO. : 6,810,519 B1
APPLICATION NO. : 09/675620
DATED : October 26, 2004
INVENTOR(S) : Daniel Rodman Hicks It is certified that error appears in the above-identified patent and that said Letters Patent is hereby corrected as shown below:

28. (Currently Amended) The computer readable medium framework of claim 26, wherein a determination of whether said constant pool entry provided by said calling Java® object-oriented programming environment method is to be resolved to a clone class is made by performing the steps of:
    extracting a corresponding constant pool entry pointer;
    resolving the constant pool entry to its class; and
    determining if the constant pool entry has been resolved to a clone class.

Signed and Sealed this

Twenty-fourth Day of October, 2006

JON W. DUDAS
*Director of the United States Patent and Trademark Office*